May 25, 1937.  G. E. HOWARD  2,081,858
APPARATUS FOR FORMING HOLLOW GLASSWARE
Filed Sept. 22, 1934  8 Sheets-Sheet 1

Fig. 1.

Witness:
W. B. Thayer.

Inventor:
George E. Howard
by Brown & Parham
Attorneys

May 25, 1937.   G. E. HOWARD   2,081,858
APPARATUS FOR FORMING HOLLOW GLASSWARE
Filed Sept. 22, 1934   8 Sheets-Sheet 2

May 25, 1937.  G. E. HOWARD  2,081,858
APPARATUS FOR FORMING HOLLOW GLASSWARE
Filed Sept. 22, 1934  8 Sheets-Sheet 3

*Fig. 3.*

Witness:

Inventor:
George E. Howard
by Brown + Parker
Attorneys

Fig. 6.

Patented May 25, 1937

2,081,858

UNITED STATES PATENT OFFICE 2,081,858

APPARATUS FOR FORMING HOLLOW GLASSWARE

George E. Howard, Butler, Pa., assignor to Hartford-Empire Company, Hartford, Conn., a corporation of Delaware Application September 22, 1934, Serial No. 745,020

13 Claims. (Cl. 49—9)

This invention relates to apparatus for forming hollow glassware and more particularly to a machine adapted to be supplied with charges of molten glass from above and to form such charges into articles of the narrow neck type.

Among the objects of my present invention are to provide a machine of the type generally set forth above including invertible blank molds mounted upon one rotary carrier, final blow molds mounted upon another and laterally spaced rotary carrier and transfer means moving in a path encircling both carriers for transferring parisons from the blank molds to the blow molds.

A further object of the present invention is to provide apparatus as generally set forth above, wherein the transfer means, or specifically the tongs, by which the parisons are transferred from the blank molds to the blow molds are so constructed and arranged in relation to the blow molds that they release parisons to the blow molds and after these parisons have been blown to final form in the blow molds, the finished articles are removed from the blow molds by the same transfer means or tongs by which they were transferred thereto, so that the discharge of the completed articles may take place during movement thereof along a straight path rather than along a curved path.

A further object of the present invention is to provide apparatus of the type above generally set forth wherein provision is made for varying the period during which parisons are permitted to reheat out of contact with both the blank and the blow molds, so as to establish for the machine a time cycle wherein various operations may take place simultaneously and wherein a plurality of articles may be simultaneously in the process of formation for each of the blank molds provided on the machine.

A further object of the present invention is to provide a transfer means, specifically tongs, for transferring parisons from the blank molds to the blow molds by movement in an orbital path encircling the blank and blow mold carriers and to provide means in conjunction therewith to cause the transfer means or tongs to follow the path of the blank molds and/or the blow molds for a portion of their paths different from the normal path of the flexible carrier by which the transfer means are carried.

A further and specific object of the present invention is to provide transfer tongs and bottom plates carried by an endless carrier encircling the blank and blow mold carriages and to provide vertical movement for the bottom plates during the period that a parison is being transferred from a blank mold to a blow mold in order to control the elongation of such parison.

Other and more specific objects of the present invention will become apparent from a description of one embodiment thereof in the following specification, and from the appended claims. In the accompanying drawings.

General construction

The machine which I have chosen to illustrate in the accompanying drawings comprises broadly a blank mold carriage generally indicated at 1, and a blow mold carriage generally indicated at 2, each of these carriages being suitably arranged for rotation, which in the present machine is preferably continuous.

Figure 8:
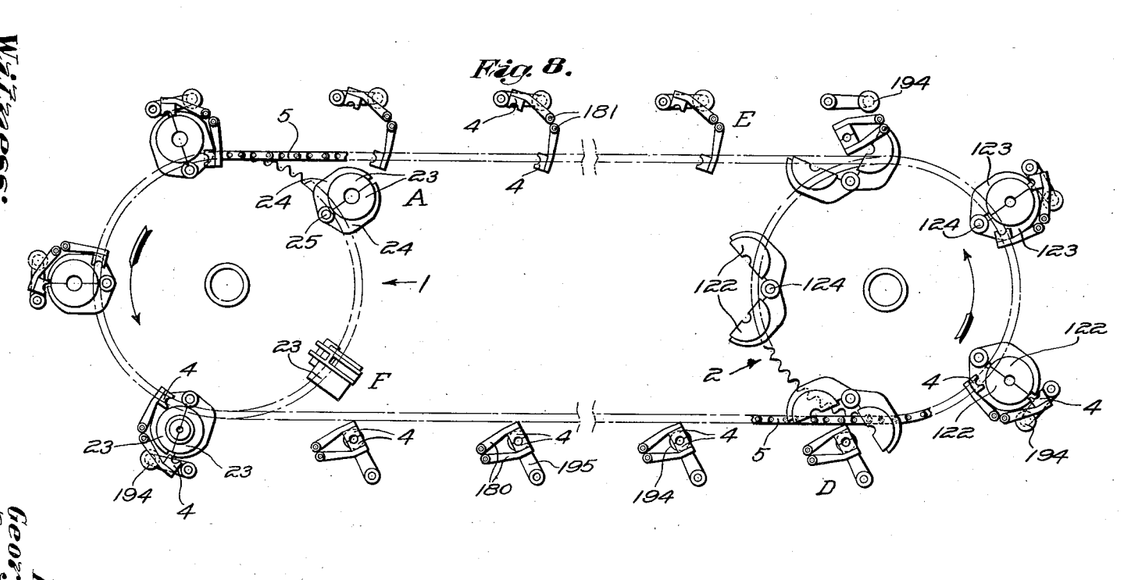
Fig. 8 is a diagrammatic view substantially in plan illustrating the operation of the entire machine.

The blank and blow mold carriages are laterally spaced apart but secured in a predetermined spaced relation to each other by an overhead structure generally indicated at 3. Each of the carriages, as best illustrated in Fig. 8, is provided with five forming units, although it will be understood that any desired number may be employed. It is not necessary that there be the same number of forming units on the blank mold and blow mold carriages, although this is a usual relationship.

Parisons formed in the blank molds, as hereinafter to be more fully described, are transferred to the blow molds by transfer means, which in the present case comprise tongs 4, the tongs being suitably mounted upon an endless flexible carrier here shown as a sprocket chain 5, by which motion is also imparted from the blank mold carriage to the blow mold carriage. The arrangement is such that parisons are permitted a material period of time to reheat and elongate during their travel in the tongs from the blank molds to the blow molds along a path tangent to these carriages on one side. The parisons are then released to blow molds. Following the completion of the final blowing operation, the finished articles are re-engaged upon the opening of the blow molds by the tongs and moved along the other tangent path to some intermediate position at which they are released from the tongs for removal to some suitable point where they are annealed.

Figure 2:
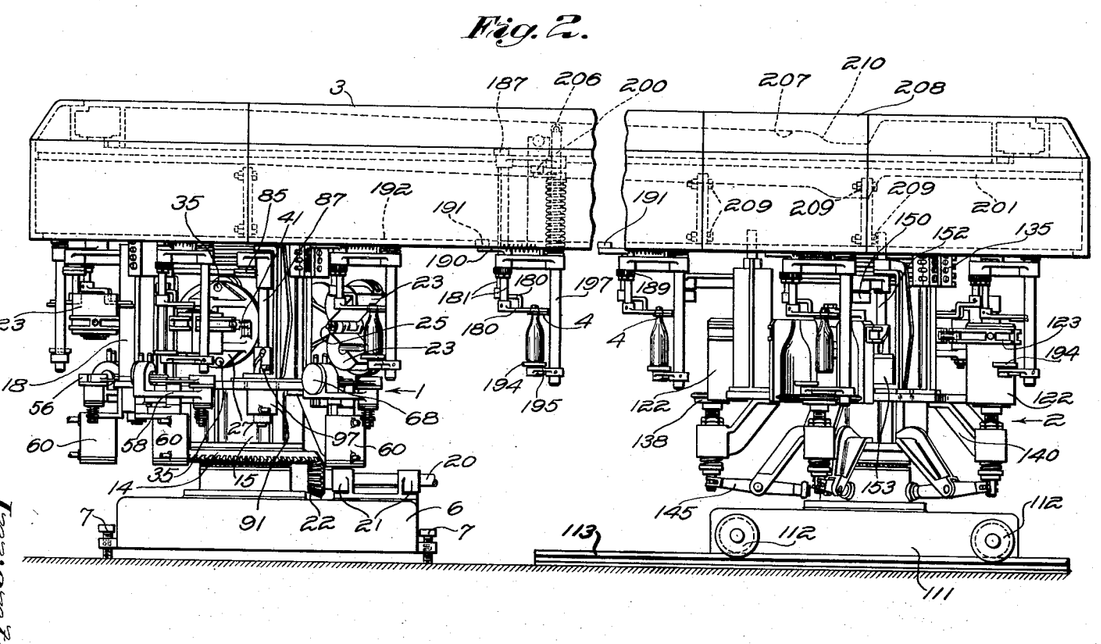
Fig. 2 is a side elevation of the machine illustrated in Fig. 1.

Turning now more particularly to the particular construction of the device, and referring to Fig. 2, the blank mold carriage 1 is mounted upon a suitably stationary base 6 which may be fixedly secured in any desired position, as on the floor of a factory, by suitable means here shown, for example, as jack screws 7. These screws permit the proper leveling of the blank mold carriage in the well-known manner.

Figure 5:
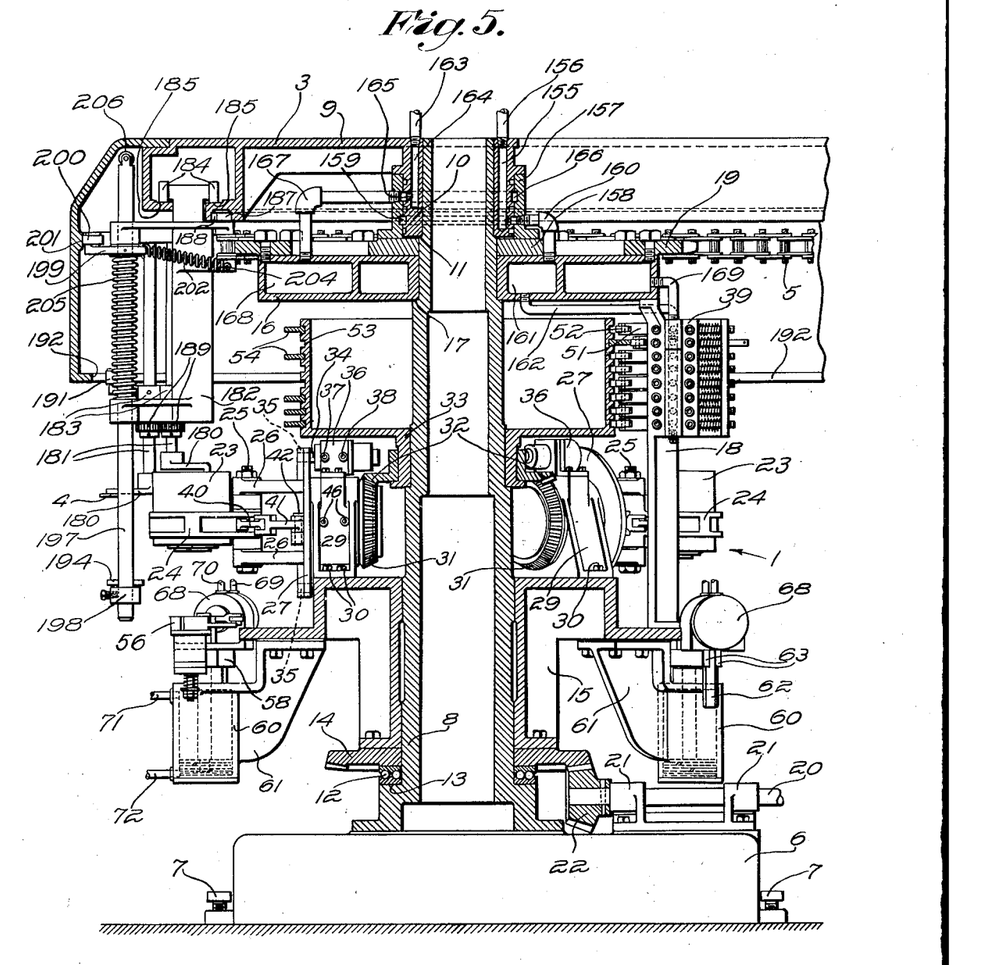
Figs. 5 and 6 together represent a vertical midsection through the machine, Fig. 5 showing particularly the blank mold carriage and associated mechanism and Fig. 6 the blow mold carriage and associated mechanism.

Referring now to Fig. 5, it will be seen that extending upward centrally of the base 6 is a stationary hollow column 8 which is stepped, as illustrated, for reasons which will hereinafter appear. At its upper end the column 8 supports the left-hand end, as seen in the drawings, of the stationary upper structure 3, connecting the non-rotating parts of the blank and blow mold carriages, this upper structure being provided for the purpose with an inwardly directed web portion 9 having an aperture therein for receiving the upper end of the column 8 and arranged with a sleeve portion 10 seating upon an annular shoulder 11 of the column.

The rotatable blank mold carrier 1 is composed of several parts as hereinafter set forth, which are arranged for rotation about various portions of the column 8. Adjacent to the lower end of this column are suitable ball bearings or other anti-friction devices 12 (Fig. 5) for assuming the vertical thrust load of the rotatable carriage 1. The ball bearings 12 are received between suitable raceways, the lower one supported on a shoulder 13 of the column 8 and the upper one suitably secured to the underside of a bevel gear 14 by which the carriage 1 is rotated. Secured to the upper side of the bevel gear 14 is a member 15 having a sleeve portion in engagement with the column 8 and having other portions arranged to support various of the operating mechanisms of the blank mold carriage. Arranged about an upper part of the column 8 is a rotatable hollow air chest 16 which is sleeved about the column and rests upon the annular shoulder 17 thereof. The air chest 16 is suitably connected to the member 15 by a plurality of rigid bracket members 18. Secured to the upper side of the air chest 18 is an annular sprocket wheel 19 about which the sprocket chain 5 passes. Thus motion imparted to the bevel gear 14 will be transmitted through the member 15, bracket members 18, and air chest 16 to the sprocket wheel 19.

The blank and blow mold carriages are preferably rotated from any suitable source of power (not shown) through a drive shaft 20, Figs. 2 and 5. This drive shaft is journaled in suitable bearings 21 formed on a bracket secured to the base 6 and is provided at its inner end with a beveled pinion 22 meshing with the bevel gear 14.

It is preferred that the drive for the machine be suitably synchronized with that of an associated automatic feeder (not shown) in such a way that the machine and feeder will always be driven in synchronism with each other, and preferably also there is provided some means by which the machine may be thrown out of operation while the feeder is permitted to continue its operation. There is preferably also provided some suitable means by which the power drive may be disconnected upon the occurrence of an overload in or around the machine which might cause breakage of the parts. However, inasmuch as these various features of the drive are all old in the art, it has not been thought necessary to illustrate them in the present drawings, as no invention is claimed herein as to these features.

*The blank molds and their operating means*

The blank molds of the machine shown in the accompanying drawings are all similar each to the others, so that a description of one will suffice for all. These molds are made in the usual manner in complementary portions or halves 23 which may be supported in the usual mold holders 24 preferably pivoted on a common pintle 25. The pintle 25 is carried, as best seen in Fig. 5, by brackets or ears 26 extending from an invert head 27.

The head 27 is carried by a pneumatic cylinder 28 (Fig. 3) which is journaled in a suitable substantially radially disposed bearing bracket 29. The bracket 29 is secured as by bolts 30 to a part of the rotatable member 15 above referred to. Radial movement of the cylinder 28 within the bracket 29 is prevented by the head 27 on the outer side secured to the cylinder and by a bevel gear 31 secured to the cylinder 28 radially inside the bracket 29. Inversion and reversion of the cylinder 28 and the blank mold carried thereby is effected by engagement between the bevel gear 31 and segmental rack portions 32 (Figs. 3 and 5) which are secured in stationary relation to and about the stationary column 8. As illustrated, the rack portions 32 are secured about an annular sleeve portion 33 which is in turn secured in any suitable manner (not shown) to the column 8.

Locking of the invert head and the blank mold in either inverted or reverted positions is effected by the insertion of a pin 34 in one or the other of a pair of apertures 35 formed in the head 27. The pin 34 is formed as the outer end of a piston rod extending from the pneumatic cylinder 36, which is preferably secured to the upper side of the bracket 29. Pressure may be conducted to the opposite ends of the cylinder 36 through pipes 37 and 38 from a suitable valve block or timer generally indicated at 39, one of these timers being provided for each of the blank mold units, and hereinafter to be described in detail.

Means are provided for opening and closing the blank molds at the desired times, such means comprising a pair of links 40 connecting the mold holders 24 with the outer ends of a pair of bell cranks 41 which are pivoted on pintles 42 to the invertible head 27.

Figure 3:
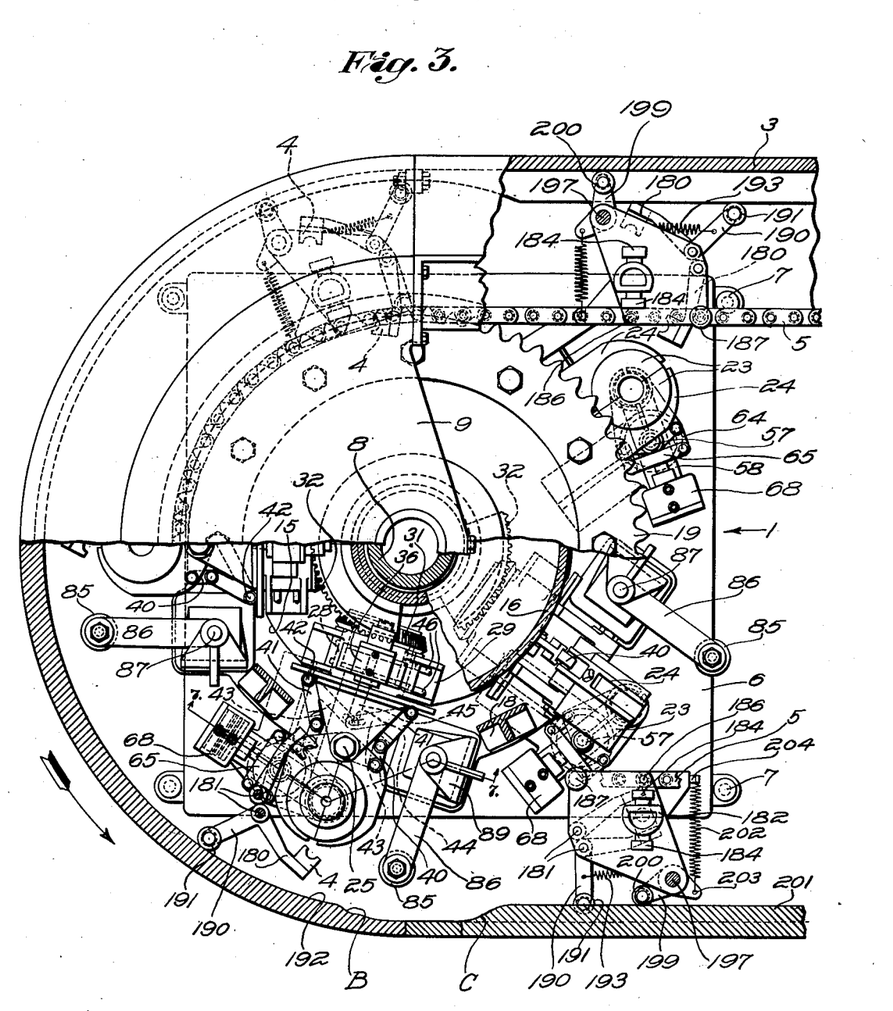
Figs. 3 and 4 are horizontal sectional views of the machine taken at different levels for different parts, that is, some parts being broken away and shown further down in horizontal section, while some parts are shown substantially in top plan, Fig. 3 illustrating particularly the blank mold carriage and Fig. 4 being a horizontal section taken substantially on the line 4—4 of Fig. 6 illustrating the blow mold carriage.

The other arms of the bell cranks 41 are illustrated in dotted lines at 43 at the lower left-hand portion of Fig. 3 and are provided with longitudinally elongated slots therein through which extends a pin 44 secured in the outer end of the piston rod 45 extending from the pneumatic cylinder 28. Pressure may be conducted to the opposite ends of the cylinder 28 through pipes 46 from the timer or valve block 39, this pressure passing through one side of the bearing bracket 29 to annular grooves formed therein around the cylinder 28 and thence through ports in the cylinder to the opposite ends thereof. Thus pressure may be conducted to and/or exhausted from the opposite ends of the cylinder 28 at any time independently of the position or inversion of the cylinder. Radially inward movement of the piston within the cylinder 28 causes the inward movement of the piston rod 45 which rotates the bell cranks 41 in a direction to open the associated blank mold, while outward movement of the piston within this cylinder is effective to close the mold and to lock the mold closed due to the substantially toggle arrangement between the links 40 and the arms of the bell cranks 41 pivoted thereto, as illustrated in Fig. 3.

The timer or valve block 39 comprises a bank of individual valves, each of which is arranged to control one particular operation. The valves may be constructed as shown at the right just above the center in Fig. 4 and are arranged to be supplied with pressure through a passage 47, as shown in that figure, and to supply such pressure alternatively to pipes 48 or 49, the pipe not being supplied with pressure from the supply passage 47 being opened to exhaust to the atmosphere.

The valves are provided with pistons as illustrated at 50, which are spring pressed, as by a compression spring 51, toward their radially inner position, so that the roller 52 carried by the inner ends of the piston 50 will be held in contact with an associated stationary cam. The several valve operating cams are suitably adjustably secured in grooves in a cam drum 53, which may be integral with the sleeve 33 and thereby be secured to the stationary hollow column 8. It will be understood that the cam segments illustrated at 54 by which the valves are directly controlled may be made interchangeable and also adjustable around the various grooves in the drum 53, and may be secured in any desired adjusted position by suitable means (not shown). Thus, each of the cams on the cam drum 53 will cooperate with the corresponding valves of each of the valve blocks or timers 39 to cause each of the several blank molds to be operated in the same cycle.

*Neck forming means, construction, mounting and operation*

Each of the blank molds is preferably provided with an associated neck ring which is not invertible therewith, but which may be opened and closed in the usual manner, and which may also be moved vertically after it has been opened so as to free the blank mold for reversion. As shown best in Fig. 7, the neck rings 55 are formed in the usual complementary split portions or halves suitably secured within holders 56, the latter being pivoted upon a common pintle 57 carried by the head 58. The head 58 is mounted upon the upper end of the piston rod 59 extending from a pneumatic cylinder 60 which is carried by a bracket 61 from the carriage member 15. Means are provided for guiding the head 58 to prevent rotation thereof about the vertical axis of the piston rod 59, such means comprising a guide rod 62 secured in the head 58 and extending between suitable guides 63 which are secured to the cylinder 60.

Figure 7:
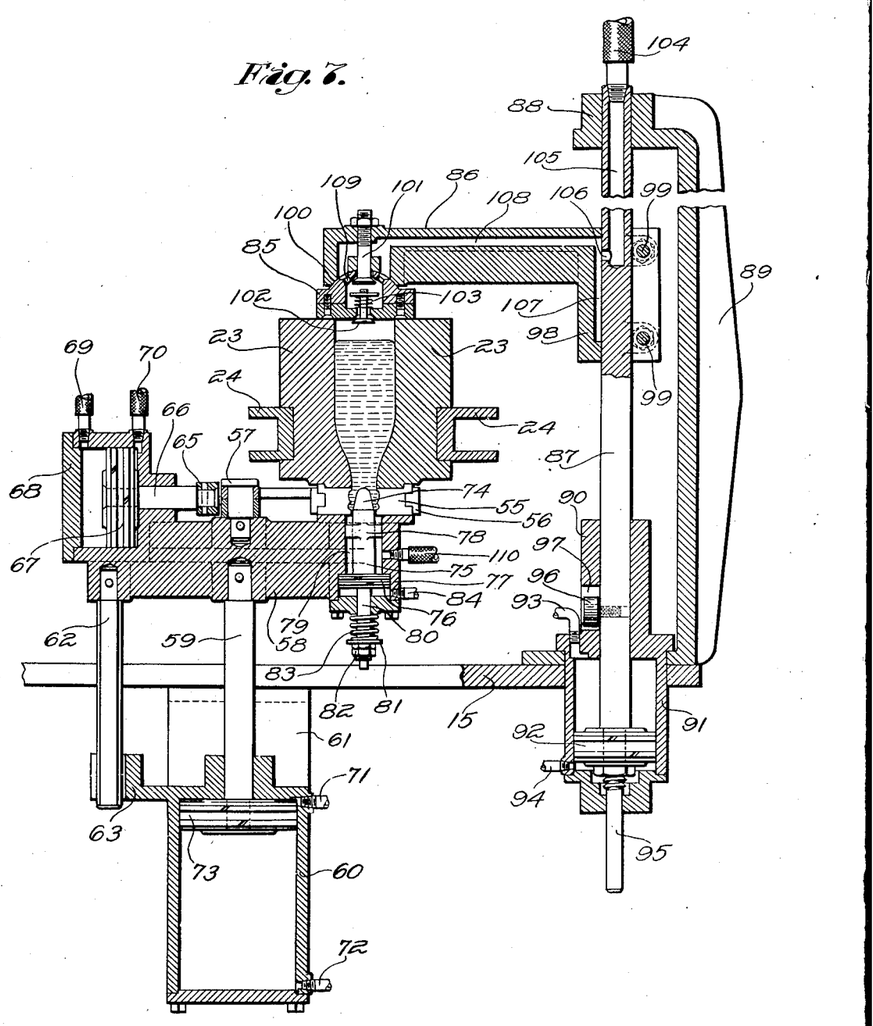
Fig. 7 is a detail view principally in vertical section illustrating a blank mold and associated neck forming means and the associated combined settle blow head and counterblow baffle and its operating means.

Opening and closing movements of the neck ring are accomplished by connecting portions of the neck ring holders 56 through short links 64 (Fig. 3) with a cross head 65 (Figs. 3 and 7) carried by the outer end of a piston rod 66 secured to the piston 67 in a pneumatic cylinder 68. Pressure may be conducted to the opposite ends of the cylinder 68 through pipes 69 and 70 from the timer or valve block 39 in any well known manner. Thus movement of the piston 67 to the right in the cylinder 68, as seen in Fig. 7, will effect the closing of the neck ring, while movement to the left will cause the opening thereof.

Vertical movements of the neck ring are effected by vertically raising and lowering the head 58 and all parts carried thereby, this action being accomplished by admitting pressure to one end or the other of the cylinder 60 through the pipes 71 or 72, pressure being exhausted through one pipe while it is admitted through the other. This will cause the vertical movement of the piston 73 in cylinder 60 and thus cause vertical movement of the head 58 carrying the neck ring and its opening and closing mechanism. The pipes 71 and 72 communicate with a suitable valve in the timer or valve block 39.

Associated with each of the neck rings there is a neck pin 74 which is arranged for vertical movement with respect to the head 58. As shown, the neck pin 74 is mounted upon the upper end of the piston rod 75 secured to a piston 76 extending from a pneumatic cylinder 77 formed in the head 58. The piston rod 75 is preferably provided with a plurality of ribs or studs 78 bearing against the sides of an enlarged bore 79 extending from the upper end of the cylinder 77 to the upper side of the head 58 and communicating with a passage for the admission of counterblowing air, as will hereinafter be described. A reduced portion of the piston rod 75 is illustrated at 80 and extends through the lower head of the cylinder 77, it being provided at a predetermined point therebeneath with a washer 81 secured against downward movement by lock nuts 82. Extending between the washer 81 and the lower head of the cylinder 77 is a compression spring 83 arranged continuously to urge the piston 76 downwardly in the cylinder so as to draw the neck pin out of the glass. When it is desired to move the neck pin into its upper or operative position, pressure may be conducted to the cylinder 77 beneath the piston 76 therein through a pipe 84 from one of the valves in the valve block or timer 39. It will be understood that the exhausting of pressure through the pipe 84 will permit the lowering of the neck pin 74 under the action of the compression spring 83. Thus the neck pin is moved vertically by vertical movement of the head 58 and is also provided with an additional vertical movement with respect to this head.

*Combined settle blowhead and counterblow baffle, mounting, construction and operation*

Associated with each of the blank molds and mounted upon the blank mold carrier is a combined settle blowhead and counterblow baffle generally indicated at 85, this head being carried by a laterally extending arm 86, which is supported on a vertical shaft 87. The shaft 87 is suitably journaled in an upper bearing 88 formed in the upper portion of the bracket 89 secured to the table member 15 and also in a lower bearing 90 formed in the upper head of a pneumatic cylinder 91 which is also secured to the member 15.

Vertical movements are imparted to the head 85 by vertically moving the shaft 87. For this purpose the shaft 87 is fixed to the piston 92 in the cylinder 91. Pressure is conducted to the cylinder 91 through pipes 93 and 94 communicating with the opposite ends thereof and with the timer or valve block 39. As shown, the piston 92 is provided with a depending piston rod portion 95 extending through the lower head of the cylinder 91 for guiding the parts and maintaining the alignment thereof. Lateral movements are imparted to the head 85 in response to the vertical movements thereof by providing the shaft 87 with a laterally extending stud carrying a cam roller 96 which is arranged to work in a helical slot 97, seen best in Fig. 2.

Vertical adjustment of the head 85 to compensate for molds of various heights may be effected by an adjustment between the arm 86 and the shaft 87. As shown, the arm is provided with a split collar 98 surrounding the shaft and adapted to be secured in any desired adjusted position thereon by a pair of clamping bolts 99.

The head 85 is arranged for free floating movement on the outer end of the arm 86 as by forming the head with a convex semi-spherical surface 100 adapted to be received in a complementary cavity in the end of the arm 86 and secured against excessive movement with respect thereto by a bolt 101 extending loosely through an enlarged aperture in the head 85 from the hollow interior thereof and secured to the arm 86 as illustrated in Fig. 7. The lower portion of the head 85 is provided with a through passage controlled by a poppet valve 102, which is constantly urged toward its closed position by a compression spring 103 as illustrated.

Settle blowing air is conducted to the head 85 from the pipe 104 which communicates with the timer or valve box 39 and with the upper end of the shaft 87, a portion of this pipe being made of flexible tubing to permit of the necessary movements of the shaft 87 as aforesaid. The pipe 104 communicates with a longitudinal bore 105 extending down from the upper end of the shaft 87 and this in turn through a lateral bore or passage 106 communicates with a chamber 107 within the split collar 98. This chamber is elongated so as to communicate with the lateral bore 106 in all vertically adjusted positions of the arm 86 with respect to the shaft 87. The chamber 107 communicates through a longitudinal bore 108 in the arm 86 with suitable registering passages 109 between a chamber in the outer end of the arm 86 and the interior of the head 85 as shown. This interior communicates with the lower side of the head 85 through the valve 102.

Thus pressure may be supplied through the pipe 104 to and through the bores 105 and 106, the chamber 107, the bore 108 and passages 109 to the interior of the head 85, and thence will pass to the underside of the head and into the interior of the mold by unseating the valve 102 against the compression of the spring 103. When later this pressure is cut off, the valve 102 will again be seated by the spring 103 to cause it to lie flush with the underside of the head 85.

When it is desired to counterblow the packed charge to form a parison, pressure is first exhausted through the pipe 84 permitting the retraction of the neck pin under the compression of spring 83 and thereafter pressure is supplied from the timer 39 through the flexible pipe 110 to the interior of the bore 79, whence it passes upward past the studs 78 and around the neck pin to counterblow the glass and expand it into conformity with the internal cavity of the blank mold and against the under surface of the head 85, which is now acting as a counterblow baffle. During this operation, the valve 102 remains closed under the compression of the spring 103, thus preventing passage of glass into the interior of the head 85. The parison has now been completed and is in readiness for the next operation, as set forth hereinafter in describing the operation of the entire machine.

*Blow mold carriage, construction and mounting*

Spaced from the blank mold carriage, as above generally set forth, is the blow mold carriage 2. This carriage is mounted upon a base 111 which is preferably provided with wheels 112 adapted to run on rails 113 which are parallel to the line of centers of the blank or blow mold carriages. The arrangement is such that if it is desired to provide a different distance of travel for the transfer means hereinabove referred to, the blow mold carrier may be moved bodily along the rails 113 to provide such different distance of travel.

Mounted upon the base 111 of the blow mold carriage is a stationary hollow column 114 which is essentially similar to the hollow column 8 above described. At its upper end the column 114 supports a sleeve portion 115 integral or rigid with the upper structure 3 and supporting this end of that structure. The sleeve portion 115 rests upon a shoulder 116 formed on the hollow column 114.

The rotatable portions of the blow mold carriage have their weight supported on ball bearings 117 (Fig. 6) arranged between suitable raceways, the lower of which is supported on a shoulder of the hollow column 114 and the upper of which is carried by a table member 118 which is sleeved about the column. Journaled around an upper portion of a hollow column 114 is an upper rotatable member or air chest 119, this member being connected to the member 118 by a plurality of brackets 120, as thus shown in Figs. 4 and 6. Carried by and secured to the member 119 is an annular sprocket wheel 121 about which the sprocket chain 5 passes, thereby imparting rotative movements to the blow mold carriage from the blank mold carriage.

*Final blow molds, mounting and operation*

Figure 4:
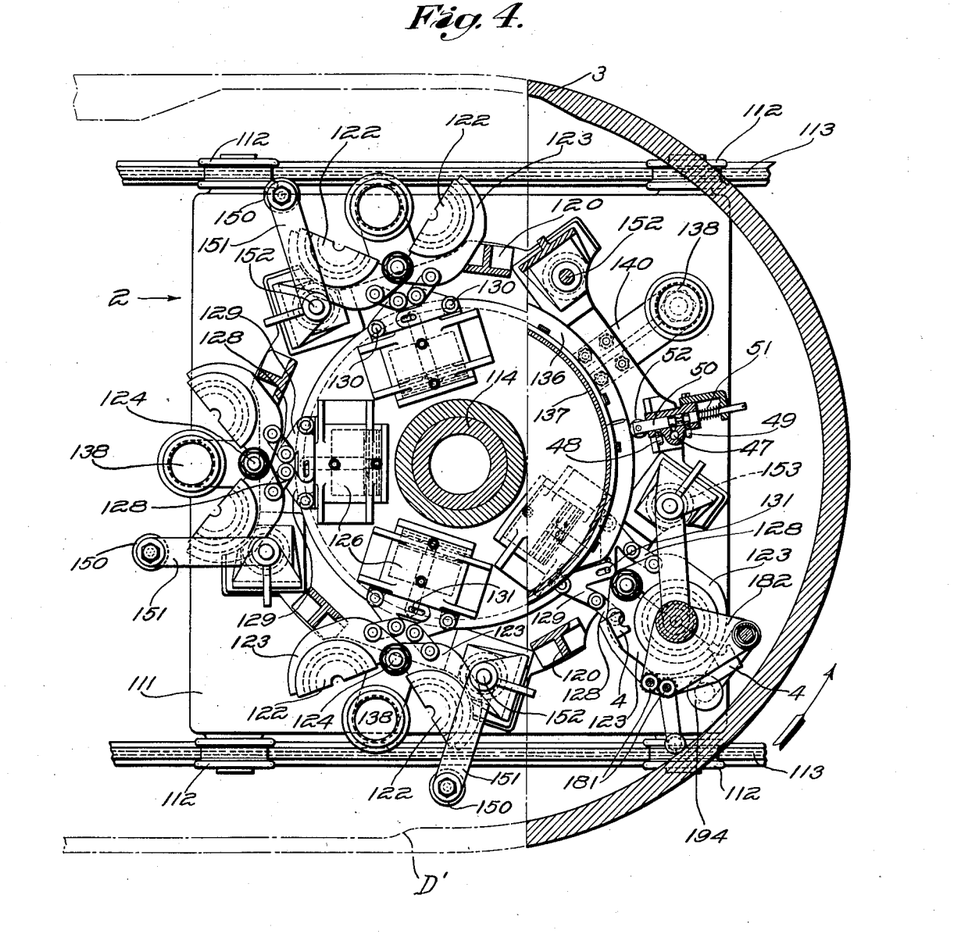
Figure 6:
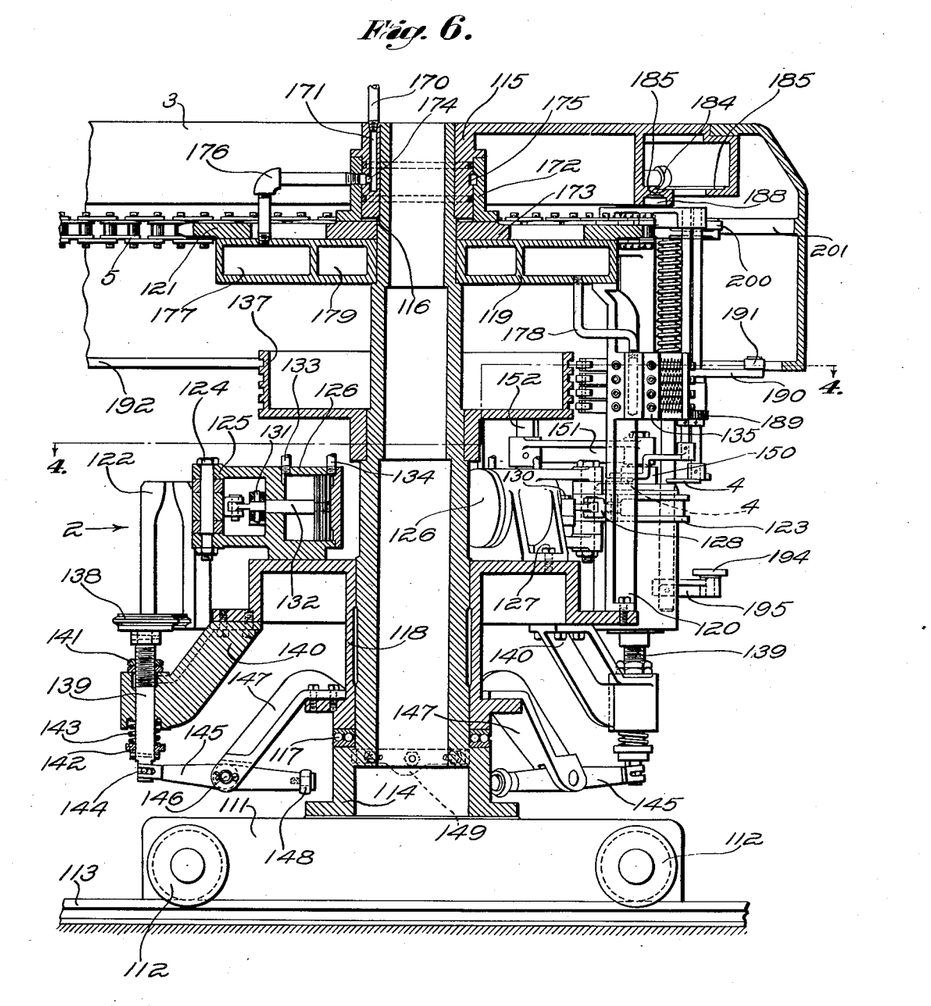

Arranged around the final blow mold carrier are a plurality, in this case five, of final blow molds 122. These molds are made in the usual manner in complementary portions or halves interchangeably carried by the usual blow mold holders 123. The holders 123 are mounted upon a common pintle 124 as best seen in Figs. 4 and 6, these pintles being carried by ears 125 extending from a blow mold operating cylinder 126, which is suitably secured, as by bolts 127, to the member 118.

Means are provided for opening and closing the blow molds in a manner generally similar to the means previously described for opening and closing the blank molds, such means including links 128 connecting the blow mold holders 123 with the outer ends of bell cranks 129 which are pivoted upon suitable pintles 130 to the cylinder 126. The other arms of the bell cranks 129 are provided with elongated slots through which passes a pin 131 secured in the outer end of the piston rod 132 associated with the cylinder 126. Pipes 133 and 134 communicate between the opposite ends of the cylinder 126 and a suitable valve in the valve box or timer generally indicated at 135.

This valve box or timer may be carried by the bracket 120 and is similar to the valve box or timer 39 above described except that it includes a fewer number of valves, as there are fewer operations to be controlled thereby. It will be understood that one of these valve boxes or timers is provided for each blow mold unit. A plurality of replaceable and adjusted cams, as illustrated at 136 (Fig. 4) is provided about a stationary cam drum 137 for operating the several valves in the valve box or timer 135. The cam drum 137 is suitably carried by the stationary hollow column 114, as best illustrated in Fig. 6, and is secured thereto in any suitable manner (not shown).

By the above described means therefore the blow mold may be opened and closed at any desired times according to the setting of the associated cam 136 on the cam drum 137.

*Final blow bottom plates*

Associated with each of the final blow molds 122 is a bottom plate 138 which is preferably interchangeably mounted on the upper end of a slide rod 139 arranged for vertical sliding movement in a bracket 140 carried by the member 118. The lowermost and operative position of the bottom plate 138 is predetermined by a pair of lock nuts 141 threaded on the slide rod 139 and arranged to rest upon the upper surface of the bracket 140. There is also arranged on the slide rod 139 in a position spaced below the under side of the bracket 140, a collar 142 which is preferably pinned or otherwise secured to the slide rod and which is separated from the underside of the bracket 140 by a compression spring 143 coiled around the slide rod 139. The construction thus far described is one in which the bottom plates are constantly urged toward their lowermost operative position by the tension of the spring 143 in addition to gravity.

Secured in the bottom end of the slide rod is a cross pin 144 which is received in a suitable slot or bifurcation in the outer end of a lever 145 pivoted intermediate its ends at 146 to a bracket 147 which is secured to the member 118. At its inner end the lever 145 carries a cam roller 148 arranged to engage beneath a cam shown in dotted lines in Fig. 6 at 149 to depress this inner end of the lever and thus move the slide rod 139 and the bottom plate 138 upwardly at a predetermined place in the rotation of the blow mold carriage. The purpose of this construction, as will be hereinafter more fully set forth, is to raise the completed articles subsequent to the opening of the blow molds, so that the articles may be re-engaged by the transfer means or tongs hereinafter to be described for removal from the blow molds.

*Final blow heads, construction and operation*

Associated with each of the final blow molds 122 is a blow head 150 (Figs. 2, 4 and 6). This head is not shown in detail, but is preferably of the same general construction as the head 85 shown in detail in Fig. 7, except that it need not have a spring pressed valve therein as shown at 102 in that figure. The head 150 is carried on the outer end of an arm 151 extending laterally from a vertical shaft 152 which comprises the piston rod of a pneumatic cylinder 153. The cylinder 153 is adapted to move the shaft 152 vertically, the same as cylinder 91 moves the shaft 87 vertically, and there is preferably provided means, not specifically illustrated, for rotating the shaft 152 in a manner subject to the vertical movement thereof in the same way as that particularly illustrated for the shaft 87.

Pressure may be conducted to the opposite ends of cylinder 153 from the timer or valve block 135 in the well-known manner and substantially the same as that particularly illustrated for the cylinder 91 operating the settle blow head. Pressure may also be conducted to the head 150 through a suitable pipe from the timer or valve block 135 for supplying final blowing pressure to the interior of the parison in the blow mold 122 to blow it to final form therein. Inasmuch as these constructions are substantially conventional, they are not illustrated in detail. It will be understood, however, that the blow head 150 may be swung laterally and lowered into contact with the blow mold at the desired time in the rotation of the blow mold carriage under the control of one of the cams on the cam drum 137 and that blowing pressure may thereafter be applied for a desired and adjustable period of time for blowing the articles to final form in the blow molds, after which the blowing pressure may be cut off and then at another and independently adjustable time the blow head may be raised and swung to one side to an inoperative position, as shown at the left of Fig. 4.

*Air distribution*

Means are provided in my machine for distributing air pressure for operating the various pneumatically operated mechanisms and also for supplying blowing pressure as and when desired. As shown (Fig. 5), high pressure air is supplied to a semi-annular stationary chamber 155 formed in the stationary collar 10 through a pipe 156 from a suitable source of supply. Surrounding this collar and in substantially air-tight relation therewith is a rotating band or collar 157 which is suitably secured to the rotating blank mold carriage 1, particularly by clamping it to the hub portion 158 of the sprocket wheel 19.

The collars 10 and 157 have registering annular grooves generally indicated at 159 communicating with the interior of the chamber 155 through one or more bores, and also communicating through one or more pipes 160 with the annular chamber 161 formed in the air chest 16. The chamber 161 is connected by pipes 162 with the necessary valves of each of the timers or valve chests 39.

Low pressure air is similarly conducted from any desired source of such pressure through the pipe 163 to a semi-annular chamber 164 formed in the opposite side of the collar 10 from the chamber 155. This chamber 164 communicates through one or more bores, as shown at 165 with registering annular grooves 166 in the collars 10 and 157 and those grooves communicate through one or more pipes 167 with an outer annular chamber 168 formed in the air chest 16. The chamber 168 communicates with certain of the valves of each of the timers or valve boxes 39 through the pipes 169.

In the usual case, high pressure air will be employed for operating the various pneumatic cylinders, such as 60, 68, etc., while low pressure air will be employed for effecting the several blowing operations, such as settle blowing and counterblowing hereinabove referred to.

A somewhat similar arrangement is employed for distribution of air to the several forming units of the final blow mold carriage, comprising as shown a pipe 170 leading from a suitable source of supply of air under pressure to a semi-annular chamber 171 formed in the collar 115 which is integral or rigid with the upper structure 3. Surrounding this collar is a rotatable collar 172 corresponding to the collar 157 and similarly attached to the hub portion 173 of the sprocket wheel 121 which rotates with the final blow mold carriage 2. Pressure from the chamber 171 is transmitted through one or more lateral bores 174 to an annular chamber 175 formed by registering grooves cut in the collars 115 and 172, this annular chamber communicating through one or more pipes 176 with an annular chamber 177 formed in the air chest member 119. This annular chamber 177 communicates with each of the valve chests or timers 135 through pipes 178.

While I have shown in this instance air at only one pressure supplied to the final blow mold carriage, it will be understood that air at two or more different pressures may be employed if desired, there being a second annular chamber 179 formed in the air chest member 119, which may be employed for this purpose in a manner similar to that shown in Fig. 5.

*Parison transfer means, construction and operation*

In transferring parisons from the blank molds to the blow molds, I prefer to employ means in the present instance comprising tongs moving in a path encircling both the blank and blow mold carriages. It will be understood, however, that under certain circumstances, and from a broad point of view, it might be possible to carry neck rings in the path in which the tongs of the present case are carried, although this arrangement could not be carried out with a gob-fed narrow-neck machine in which the neck rings must be beneath the blank molds during the time a charge of glass is supplied thereto, and in the usual case also during the time that charge is at least being settle blown in a blank mold.

As shown, a plurality of transfer units are provided each comprising tongs 4 carried by tong arms 180. The arms 180 are suitably secured to the lower end of a pair of parallel vertical shafts 181 which are journaled in suitable upper and lower bearings in a traveling carriage 182, the shafts 181 being suitably provided with enlarged heads above either the upper or lower bearings for preventing vertical movement thereof with respect to the carriage 182. As shown best in Fig. 5, collars 183 are provided above the lower bearings for this purpose.

The carriages 182 are each provided with a pair of horizontal axis rollers 184 arranged to travel on parallel tracks 185 formed integral or rigid with the upper structure 3 as best illustrated in Fig. 5. The weight on the carriages 182 and parts appurtenant thereto are therefore carried by the rollers 184 and tracks 185. Each of the carriages 182 is secured to the sprocket chain 5 at a single vertical pivotal point, as illustrated at 186 (Fig. 3), the carriages being guided laterally in addition to their pivotal connection with the sprocket chain by a vertical axis roller 187 (Figs. 3 and 5) which rides in a cam groove 188 (Figs. 5 and 6) cut in the under surface of a flange of the structure 3 forming one of the tracks 185. The arrangement is such that the carriages 182 will be moved by the sprocket chain 5 in a path encircling the blank and blow mold carriages 1 and 2, while at the same time the alignment of the tongs with the blank molds and blow molds successively is insured by the configuration of the cam track 188.

In addition, this cam track may be provided with such a configuration as the tongs enter on a portion of their substantial tangent path upon leaving the path of the blank molds and as they are about to leave this path to align the parisons with the blow molds and also on leaving the blow mold path that the tongs will be caused to follow the paths of these molds successively for a distance slightly greater than the normal path of coincidence of these molds and the tongs and while the sprocket chain is traveling along a straight tangent, due to the relative rotation of the carriage 182 with respect to the sprocket chain about the axis of the pivotal connection 186 therebetween. This arrangement may provide for a somewhat longer use of the blank and blow molds than would otherwise be possible.

Means are provided for opening and closing the tongs when desired, such means comprising first an interconnection between the two tongs so that they will open and close simultaneously. This means comprises a pair of pinions 189 secured to the shafts 181 respectively and meshing with one another as best shown in Fig. 5. For imparting rotative movement to one of the shafts 181 and thence through the pinions 189 to the other of these shafts, one of the collars 183 is provided with a cam arm 190 (Figs. 2, 3 and 6) carrying a cam roller 191 arranged to engage the inner surface of a cam track 192. This roller is urged against the track and the tongs urged toward their closed position by a tension spring 193 connected between a point on the arm 190 and a suitable anchorage on the carriage 182. Thus the tongs may be positively opened upon the roller 191 riding up onto a high portion of the cam track 192 and may be resiliently closed under the tension of spring 193 upon the roller 191 coming into alignment with a low portion of the cam track 192.

*Bottom plate for parison elongation control*

Each of the tongs has associated therewith a means for controlling the elongation of the parisons during the reheating period, that is, while the parisons are being transferred from the blank molds to the blow molds. For this purpose, bottom plates 194 are provided associated and moving with each of the tongs 4 and tongs carriages 182. As shown, each of these bottom plates is mounted on a laterally extending arm 195, best seen in Fig. 6, extending from a vertical shaft 197 and adjustably secured thereto as by a collar and set screw 198 (Fig. 5), so that they may be operated at a vertically adjusted position with respect to the shaft 197 to compensate for parisons of different heights. The shafts 197 are journaled in suitable upper and lower bearings in the tongs carriages 182 so that the bottom plates 194 move with the tongs during their movement about the machine.

For moving the bottom plates laterally to and from a position in vertical alignment with an article held in the tongs, each of the shafts 197 is provided with a laterally extending arm 199 suitably secured thereto and provided at its outer end with a cam roller 200 arranged to travel along a cam track 201 which is formed on the inner side of a depending flange of the upper structure 3. For urging the cam roller 200 against the cam track 201, there is provided a tension spring 202 (Figs. 3 and 5) extending between a second arm 203 rigid or integral with the arm 200 and a suitable anchorage 204 on the tongs carriage 182.

Means are also provided for moving the bottom plates 194 vertically, so as to follow the elongation of the parisons during the reheating period and also so as to move them quickly away from the parisons just prior to the transfer thereof to the final blow mold, so that they may be moved from beneath the parison without distortion thereof. For this purpose compression spring 205 (Fig. 5) is provided surrounding the shaft 197 and extending between the lower bearing for this shaft in the tongs carriage 182 and the under side of the collar on the shaft with which arms 199 and 203 are integral. This spring constantly tends to urge the bottom plate 194 upward with respect to the horizontally moving carriage 182. For moving the bottom plates downward when desired, the upper ends of the shafts 197 are provided with cam rollers, best seen at 206 in Figs. 2 and 5, these rollers cooperating with the cam track shown in dotted lines at 207 in Fig. 2 and formed on the under side of the upper web of the top structure 3. It will be understood that the configuration of the cam track 201 is such that this track will be either vertically widened or changed in its vertical level to compensate for vertical movements of the bottom plates 194 under the control of cam track 207.

*Operation*

Considering now the machine as a whole and referring first to Fig. 8, in which a diagrammatic view of the entire machine is illustrated, charges of glass are adapted to be supplied to the blank molds substantially at the point A, the blank molds at that time being in their neck-down position and closed, the neck rings being elevated due to pressure to cylinder 60 being supplied through pipe 72 and exhausted through pipe 71 (Fig. 7), and closed due to pressure being supplied through pipe 69 and exhausted through pipe 70 of cylinder 68, and the neck pins being in their raised position due to pressure being supplied through pipe 84. The supplying of glass may be by any suitable means and in the usual case is accomplished by an automatic feeder of any desired type, which is arranged to supply glass to the molds during the movement thereof.

The first operation after charging is the positioning and lowering of the settle blow head 85, which is accomplished as above set forth by supplying pressure through the pipe 93 and exhausting it through the pipe 94, both of the cylinder 91. Settle blowing pressure is then supplied through the pipe 104 to settle blow the glass in the blank mold and neck ring and around the neck pin.

The next operation is the withdrawing of the neck pin, which is accomplished by exhausting pressure through pipe 84, this operation taking place at any desired time after the cessation of the application of settle blowing pressure and according to the setting of the appropriate cam on the cam drum 53 (Fig. 5).

The next operation is the supplying of counter-blowing pressure under the control of the associated cam on cam drum 53, which will expand the glass into conformity with the internal cavity of the blank mold and against the lower portion of the head 85, which at this time serves as a counterblow baffle and thus complete the formation of a hollow parison.

The next operation is the moving of the combined settle blow head and counterblowing baffle to its inoperative position, accomplished by the admission of pressure through the pipe 94 and exhaustion thereof through the pipe 93, both of cylinder 91. At about this same time the neck ring may be opened by admitting pressure through pipe 70 and exhausting it through pipe 69, both of cylinder 68, and then lowered by admitting pressure through pipe 71 and exhausting it through pipe 72, both of cylinder 60. The blank mold is now free for reversion and the gear 31 thereof comes into meshing engagement with the rack segment 32 seen at the lower left-hand side of Fig. 3, thereby bringing the blank mold to a neck-up position. It will be understood that shortly prior to the reversion of this mold, the locking pin 34 which has up to this time been engaged with one of the holes 35 in the head 27 (Fig. 5) will be withdrawn and that pin will be reengaged with the other of these holes 35 once the reversion has been completed, this being accomplished by suitable application of pressure from the timer 39 through the pipes 37 and 38 of the cylinder 36.

The neck portion of the parison is then gripped by the closing of the tongs, which occurs substantially at the point B (Fig. 3). The blank mold may then be opened releasing the parison to the tongs, which then permits their movement along the tangent portion of their path. At about the point C, the parison has ridden out of alignment with the blank mold to a sufficient extent so that the bottom plate 194 may be swung beneath the reheating parison, which is accomplished by the roller 200 riding up an incline of the cam track 201.

During the movement of the tongs with the parison held therein along the tangent portion of their path from the blank molds toward the blow molds, the parison will reheat due to the internal heat thereof penetrating through the chilled skin formed by contact of the glass with the blank mold, and will also elongate under the influence of gravity and under control of the bottom plate 194, which is being gradually lowered during this period due to the roller 206 riding down the cam track 207, as best illustrated in Fig. 2.

Figure 1:
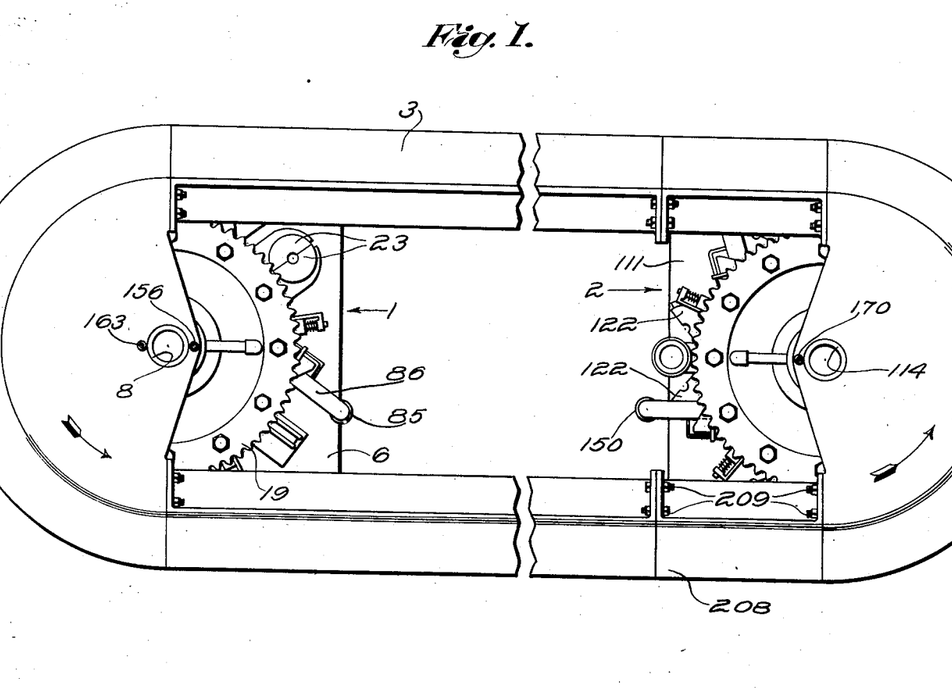
Figure 1 is a plan view of the entire machine with certain parts omitted for convenience of illustration and the center part broken away.

It is contemplated that the reheating period may be made variable for several purposes. First, to provide a desired period for reheating and elongation of the parisons. This may be done by moving the blow mold carriage toward or away from the blank mold carriage along the tracks 113 and by providing one or more removing portions, as the portion 208 for the upper structure 3, these portions being interchangeable within certain limits and being adapted to be bolted in place, as by the bolts 209 (Figs. 1 and 2). It will be understood that as many intermediate sections as desired may be employed with suitable corresponding changes made in the length of the sprocket chain 5 which will be provided with insertible portions or sections with the appropriate number of tongs carriers 182 and the appurtenant parts associated therewith, so that the machine as a whole will be coordinated for any desired length of reheating.

When a parison has been moved substantially to the point D (Fig. 8) it is in alignment with the closed position of an associated blow mold which may then be closed around the parison at about this position under the control of the timer 135 operating to supply pressure through the pipe 134 and exhaust it through pipe 133 of the blow mold operating cylinder 126. The tongs are carried at such a height that the parison must be dropped a short distance in transferring it to the blow mold, the tongs being opened at about the time the blow mold is closed and under the control of the cam track 192, which is provided for this purpose with an inclined part at the point D' (Fig. 4). It will be understood that shortly before the arrival of the parison at the point D, the bottom plate 194 will be rapidly lowered due to the cam roller 206 thereof riding down a sharp decline in the cam track 207 at 210 (Fig. 2). It then will be swung to one side under the action of the roller 200 riding into a decline in the cam track 201 and under control of the tension spring 202. The inoperative position of the bottom plate is clearly illustrated for the bottom plate at 194 at the lower right-hand part of Fig. 4.

Once the blow mold has been closed about the parison and the tongs and bottom plate have been moved to their respective inoperative positions, the final blow head 150 will be lowered and swung to its operative position surrounding the neck portion of the parison, and final blowing pressure will be applied under the control of the associated cam on cam drum 137. After a suitable desired time, final blowing pressure is cut off and the final blow head 150 raised and swung to its inoperative position, as shown for the head 150 at the upper side of Fig. 4 just to the left of the center, and the blow mold may then be opened to expose the completed article, which is still supported upon the final blow mold bottom plate 138.

The article might then be removed from the bottom plate in any desired way, but I prefer, however, to remove it from the blow mold position by the same tongs by which the parison to form that article was transferred to the blow mold. For this purpose, the cam roller 148 associated with the bottom plate 138 of that blow mold rides under the low portion of the cam 149, seen in Fig. 6, which will elevate the bottom plate and thus elevate the completed article sufficiently so that its neck may again be grasped by the tongs 4. The tongs are then closed in the same manner as above set forth under control of the cam track 192 to re-engage the completed article, so that upon lowering of the blow mold bottom plate 138 out of contact with the article, the article will be moved along the other tangent path in the direction of the blank mold carrier and may be removed substantially at the point E (Fig. 8) due to the tongs again being opened. It will be understood that any suitable conveyor, or other means, may be employed to receive the completed articles as discharged from the tongs. I have chosen, however, not to show such conveyor or other means, as it or they form no part of the present invention.

It will further be understood that once the blank mold has been moved, due to the rotation of the blank mold carrier out of alignment with the tongs, which are removing a parison just formed therein, it will again be inverted to a neck-down position and the neck ring and neck pin moved to their position, as shown in Fig. 7, in readiness for the receipt of the next charge at the point A. A blank mold in the process of this inversion is shown at the point F, Fig. 8.

The provisions above set forth for a long reheat of the parisons intermediate their treatment in the blank and final blow molds also provide a further relationship of the parts such that a plurality of articles may be simultaneously in the process of formation for each mold unit on the machine. Thus, for example, considering a plurality of glass charges, all of which were supplied to the same blank mold, one may be enclosed in that blank mold and possibly also in the process of formation into a parison therein; another, or at least one other, may be reheating in the tongs intermediate the blank and blow molds, depending of course upon the distance between the blank and blow mold carriages and the number of tongs necessarily provided in view of this distance; and another, or a third, may be enclosed within a final blow mold and possibly also final blowing pressure may be in the process of being supplied thereto to expand the glass to final form in such mold.

Various other subsidiary relationships involving simultaneous formation of a plurality of articles from charges supplied to the same blank mold may be worked out in line with the above. Any novel features of these relationships associated with the present machine or some features thereof are to be considered within the purview of this invention.

While I have shown and described but one embodiment of my present invention, it will be understood that many changes may be made therein in dimension, design and otherwise, and that certain of the instrumentalities and sub-combinations thereof may have independent utility. I do not wish to be limited therefore except by the scope of the appended claims, which are to be construed as broadly as the state of the prior art permits.

I claim:

1. Apparatus for forming hollow glass articles, comprising blank and final blow mold carriages rotatable about laterally spaced vertical axes, means for rotating said carriages, partible blank molds and respectively associated neck rings mounted on and rotating with said blank mold carriage, partible final blow molds on said final blow mold carriage, means for forming charges of glass into parisons in said blank molds and neck rings, means for inverting and reverting said blank molds with respect to the blank mold carriage, an endless carrier encircling said carriages and arranged for movement in synchronism therewith, means mounted on said endless carrier for transferring parisons from said blank molds to said final blow molds, and means for blowing parisons to final form in said blow molds.

2. Apparatus for forming hollow glass articles, comprising blank and final blow mold carriages rotatable about laterally spaced vertical axes, means for continuously rotating said carriages, partible blank molds and respectively associated neck rings mounted on and rotating with said blank mold carriage, partible final blow molds on said final blow mold carriage, means for forming charges of glass into parisons in said blank molds and neck rings, means for inverting and reverting said blank molds with respect to the blank mold carriage, an endless carrier encircling said carriages and so connected thereto as to be continuously moved by the rotation of said carriages, a plurality of tongs transfer means mounted on said endless carrier for transferring parisons from said blank molds to said final blow molds, and means for blowing parisons to final form in said final blow molds.

3. Apparatus for forming hollow glass articles, comprising blank and final blow mold carriages rotatable about laterally spaced vertical axes, means for rotating said carriages, blank molds and respectively associated partible neck rings mounted on and rotating with said blank mold carriage and so arranged thereon that the blank molds are adapted to receive charges of molten glass supplied through the open upper ends thereof, partible final blow molds on said final blow mold carriage, means for forming charges of glass supplied to said blank molds into parisons in said blank molds and neck rings, an endless carrier encircling said carriages and arranged for movement in synchronism therewith, means mounted on said endless carrier and separate and distinct from the above named means for transferring parisons from said blank molds to said final blow molds, and means for blowing parisons to final form in said final blow molds, whereby the blank molds may be supplied with charges of glass and forming operations initiated on such charges prior to movement of the blank molds into alignment with the transferring means, thereby permitting the use of the blank molds for a maximum proportion of their total time in forming glass parisons.

4. Apparatus for forming hollow glass articles, comprising blank and final blow mold carriages rotatable about laterally spaced vertical axes, means for continuously rotating said carriages, partible blank molds mounted on said blank mold carriage for inversion with respect thereto about substantially radial horizontal axes, a non-invertible neck ring associated with each of said blank molds and mounted on said blank mold carriage, means for inverting and reverting said blank molds with respect to the blank mold carriage, neck pins associated with each of said neck rings and movable in respect thereto, said blank molds, neck rings and neck pins being adapted to receive charges of molten glass supplied through the open upper end of the blank molds when they are in neck-down position and the associated neck rings and neck pins are in cooperatve relation therewith, means for settling charges of glass in said blank molds and neck rings and around said neck pins, means for withdrawing said neck pins, means for supplying counterblowing pressure to counterblow charges of glass in said blank molds and thereby form parisons therein, all while the blank molds continue in neck-down position, means for moving said neck rings to a position such as to permit the reversion of said blank molds, partible final blow molds on said final blow mold carriage, an endless carrier encircling said carriages and so connected thereto as to be continuously moved by the rotation of said carriages, a plurality of tongs transfer means mounted on said endless carrier for transferring parisons from said blank molds to said final blow molds, means to open said blank molds after they have been reverted to a neck-up position to release a formed parison to said tongs transfer means, means to open said tongs transfer means and to close said blow molds for releasing parisons from the tongs transfer means to the blow molds, and means for blowing parisons to final form in said blow molds.

5. Apparatus for forming hollow glass articles, comprising blank and final blow mold carriages rotatable about laterally spaced vertical axes, means for rotating said carriages, blank molds on said blank mold carriage, means for forming parisons in said blank molds, partible final blow molds on said final blow mold carriage, an endless carrier encircling said carriages and arranged for movement in synchronism therewith, means mounted on said endless carrier for transferring parisons from said blank molds to said final blow molds, means for causing the transferring means to release parisons to said final blow molds, means for blowing parisons to final form in said final blow molds, means for opening said final blow molds to expose the finished articles, and means for causing the transferring means mounted on said endless carrier to reengage the finished articles exposed by the opening of the final blow molds and to remove such articles from said final blow molds.

6. Apparatus for forming hollow glass articles, comprising blank and final blow mold carriages rotatable about laterally spaced vertical axes, means for rotating said carriages continuously, blank molds on said blank mold carriage, means for forming parisons in said blank molds, partible blow molds on said final blow mold carriage, an endless carrier encircling said carriages and arranged for continuous movement in synchronism therewith, tongs mounted on said endless carrier and constructed and arranged to transfer parisons from said blank molds to said final blow molds, means for closing and opening said tongs to grasp and release parisons in effecting the transfer, means for blowing parisons to final form in said final blow molds, means for opening said final blow molds to expose the finished articles, and means for causing said tongs to reengage the finished articles exposed by the final blow molds and to remove such articles from said final blow molds.

7. Apparatus for forming hollow glass articles, comprising blank and final blow mold carriages rotatable about laterally spaced vertical axes, means for rotating said carriages, blank molds on said blank mold carriage, means for forming parisons in said blank molds, partible final blow molds on said final blow mold carriage, an endless carrier encircling said carriages and arranged for movement in synchronism therewith, means mounted on said endless carrier for transferring parisons from said blank molds to said final blow molds, means for causing the transferring means to release parisons to said final blow molds, means for blowing parisons to final form in said final blow molds, vertically movable bottom plates associated with said final blow molds, means for opening said final blow molds to expose the finished articles, means for raising said bottom plates subsequent to the opening of the respectively associated final blow molds to lift the finished articles so that they may be re-engaged by said transferring means, and means for causing the transferring means mounted on said endless carrier to re-engage the finished articles exposed by the opening of the final blow molds and lifted by the upward movement of said bottom plates and to remove such finished articles from said final blow molds.

8. Apparatus for forming hollow glass articles, comprising blank and final blow mold carriages rotatable about laterally spaced vertical axes, means for rotating said carriages continuously, blank molds on said blank mold carriage, means for forming parisons in said blank molds, partible blow molds on said final blow mold carriage, an endless carrier encircling said carriages and arranged for continuous movement in synchronism therewith, tongs mounted on said endless carrier and constructed and arranged to transfer parisons from said blank molds to said final blow molds, means for closing and opening said tongs to grasp and release parisons in effecting the transfer, means for blowing parisons to final form in said final blow molds, means for opening said final blow molds to expose the finished articles, a vertically movable bottom plate associated with each of said final blow molds, means tending resiliently to hold said bottom plates in their lower operative positions with respect to said final blow molds, cam means effective to raise said bottom plate successively subsequent to the opening of the respective final blow molds to expose the finished articles, and means for causing said tongs mounted on said endless carrier to reengage the finished articles exposed by the opening of the final blow molds and lifted therefrom by the raising of said bottom plates as aforesaid for removing the articles from the final blow molds and out of the path of movement thereof.

9. Apparatus for forming hollow glass articles, comprising blank and final blow mold carriages rotatable about laterally spaced vertical axes, means for rotating said carriages, blank molds on said blank mold carriage, means for forming parisons therein, final blow molds on said final blow mold carriage, means for blowing parisons to final form in said final blow molds, and means for transferring parisons from said blank molds to said final blow molds, including an endless carrier encircling said carriages and arranged for movement in synchronism therewith, a plurality of travelling carriages on said endless carrier, each having means for gripping the neck portion of a parison, a single vertical axis pivotal connection between each of said travelling-carriages and said endless carrier, and means for variably controlling the angular relations of said travelling carriages in respect to said endless carrier about their respective vertical axis pivot connections therewith.

10. Apparatus for forming hollow glass articles, comprising blank and final blow mold carriages rotatable about laterally spaced vertical axes, means for rotating said carriages, blank molds on said blank mold carriage, means for forming parisons therein, final blow molds on said final blow mold carriage, means for blowing parisons to final form in said final blow molds, and means for transferring parisons from said blank molds to said final blow molds, including an endless carrier encircling said carriages and arranged for movement in synchronism therewith and having straight courses therebetween tangent to both said carriages, a plurality of travelling carriages on said endless carrier, each having tongs thereon for gripping the neck portion of a parison adapted to register alternately with a blank mold and a blow mold, a single vertical axis pivotal connection between each of said travelling carriages and said endless carrier, a vertical axis cam roller on each of said travelling carriages, and a stationary cam cooperable with said cam rollers during the movement of said travelling carriages along a portion of one of the tangent courses of said endless carrier adjacent to one of the mold carriages so constructed and arranged as to cause the tongs of said travelling carriages substantially to follow the path of their respectively cooperating molds for an arcuate travel greater than the arcuate travel of said endless carrier with the molds on the same mold carriage.

11. Apparatus for forming hollow glass articles, comprising blank and final blow mold carriages rotatable about laterally spaced vertical axes, means for rotating said carriages, blank molds on said blank mold carriage, means for forming parisons therein, final blow molds on said final blow mold carriage, means for blowing parisons to final form in said final blow molds, and means for transferring parisons from said blank molds to said final blow molds, including an endless carrier encircling said carriages and arranged for movement in synchronism therewith, means on said endless carrier for gripping the neck portions of parisons in transferring them from the blank molds to the final blow molds, means travelling in synchronism with the neck gripping portions of the transfer means for supporting the bottom portions of parisons during at least a portion of their transfer travel, and means for progressively varying the vertical position of the last-named means in respect to the vertical position of the path of travel of the neck gripping means during their cooperative travel to control the elongation of the parisons.

12. Apparatus for forming hollow glass articles, comprising blank and final blow mold carriages rotatable about laterally spaced vertical axes, means for rotating said carriages, blank molds on said blank mold carriage, means for forming parisons therein, final blow molds on said final blow mold carriage, means for blowing parisons to final form in said final blow molds, and means for transferring parisons from said blank molds to said final blow molds, including an endless carrier encircling said carriages and arranged for movement in synchronism therewith, a plurality of travelling carriages on said endless carrier, each having means for gripping the neck portion of a parison, means for supporting the bottom portions of parisons also mounted on said travelling carriages and vertically movable in respect thereto, and cam means for moving the bottom supporting means vertically with respect to their respective travelling carriages for controlling the elongation of parisons during the transfer thereof from the blank molds to the blow molds.

13. Apparatus for forming hollow glass articles, comprising blank and final blow mold carriages rotatable about laterally spaced vertical columns, means for rotating said carriages continuously, invertible blank molds and respectively associated non-invertible neck rings on said blank mold carriers and adapted to be supplied with charges of glass through the open upper ends of the blank molds, means for settling charges of glass in the blank molds and forming neck finish portions thereon in said neck rings, means for thereafter counterblowing the blanks thus formed to complete the formation of parisons in the blank molds, means for opening the neck rings and moving them to a position such as to free the blank molds and the parisons therein for reversion from a neck-down to a neck-up position, means for reverting the blank molds with the parisons therein to a neck-up position, partible final blow molds on said final blow mold carriage, means for blowing parisons to final form in said final blow molds, transfer means for transferring parisons from said blank molds to said final blow molds and for removing completed articles from the final blow molds, including an endless carrier encircling said blank and final blow mold carriages and arranged for continuous movement in synchronism therewith, an upper track-forming stationary structure supported on the vertical columns of the blank and blow mold carriages, a plurality of travelling carriages on said endless carrier and arranged for movement alternately to register with blank molds and blow molds and to move therebetween in courses tangent to the blank and blow mold carriages, track means on said upper structure for guiding and supporting said travelling carriages in their tangent courses, a single vertical axis pivotal connection between each of said travelling carriages and said endless carrier, cam means for controlling the angular position of said travelling carriages in respect to said endless carrier about the vertical axis pivotal connections therebetween, tongs on each of said travelling carriages for gripping the neck portions of parisons being transferred from the blank molds to the final blow molds, means for opening and closing said tongs to cause the tongs to grasp parisons for transfer from said blank molds, to release parisons to said blow molds, and to grasp finished articles after the blow molds have been opened, bottom supporting means for said parisons being transferred from the blank molds to the final blow molds also carried by said travelling carriages and movable vertically in respect thereto, cam means for controlling the vertical movement of the parison bottom supporting means and arranged to control the elongation of the parisons during the reheating thereof while they are being transferred from the blank molds to the final blow molds, vertically movable bottom plates associated with each of said final blow molds and arranged to be in their operative position in respect to such final blow molds at the lowermost end of their vertical paths of travel, means for opening said final blow molds to expose completed articles subsequent to the final blowing of such articles therein, and cam means operable thereafter for elevating said bottom plates with the completed articles supported thereon.

GEORGE E. HOWARD.